United States Patent [19]

Jones

[11] 4,071,044

[45] Jan. 31, 1978

[54] AIR MONITORING VALVE FOR COMBUSTION ENGINES

[76] Inventor: Ralph E. Jones, 2634 Evelyn Court, Alameda, Calif. 94501

[21] Appl. No.: 723,520

[22] Filed: Sept. 15, 1976

Related U.S. Application Data

[63] Continuation-in-part of Ser. No. 711,553, Aug. 4, 1976, abandoned.

[51] Int. Cl.² .................. F02M 23/00; F16K 17/24
[52] U.S. Cl. ................................ 137/479; 137/480; 137/517; 123/119 B; 123/119 D
[58] Field of Search ............. 137/517, 479, 480, 481, 137/482, 483, 484; 123/119 D, 119 DB, 119 B

[56] References Cited

U.S. PATENT DOCUMENTS

| | | | |
|---|---|---|---|
| 1,102,085 | 6/1914 | Ruggles | 137/479 |
| 1,220,419 | 3/1917 | Hawley | 137/517 X |
| 1,502,476 | 7/1924 | McCanna et al. | 137/479 |
| 1,640,615 | 8/1927 | Niederhe et al. | 137/479 X |
| 2,454,480 | 11/1948 | Rossman | 137/480 |
| 3,677,237 | 7/1972 | Hansen | 137/480 X |
| 3,946,710 | 3/1976 | Albano et al. | 137/517 |
| 3,990,420 | 11/1976 | Bitterman et al. | 137/517 X |

*Primary Examiner*—William R. Cline
*Attorney, Agent, or Firm*—Warren, Chickering & Grunewald

[57] ABSTRACT

A vacuum-operated, pressure-responsive valve is adapted for connection to the intake manifold of an internal combustion engine for monitoring supplemental airflow to the engine, the improvement of the present device providing precise adjustment of the supplemental airflow/intake manifold pressure relationship. An air cylinder, a pressure-responsive piston/valve mounted therein, a threadably mounted axially extending stem and valve-biasing spring, and a resiliently deflectable plate are assembled and cofunction to provide precision click stop adjustment of the supplemental airflow/engine vacuum relationship.

4 Claims, 8 Drawing Figures

U.S. Patent  Jan. 31, 1978  4,071,044
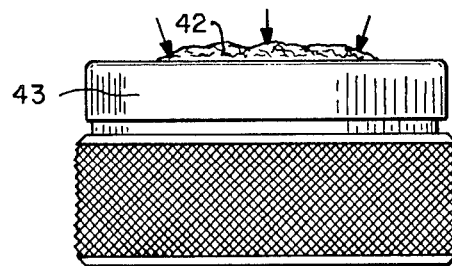
FIG.—1
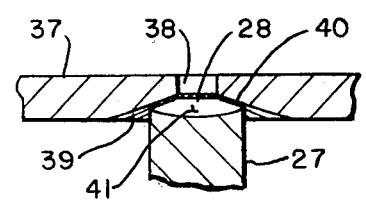
FIG.—8
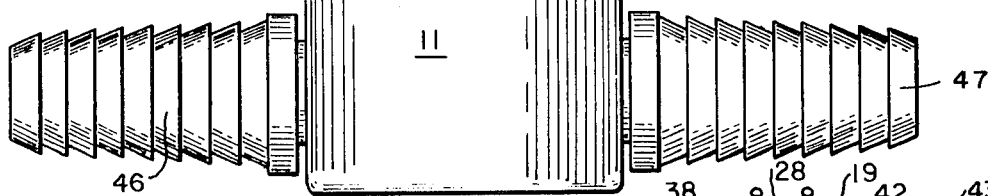
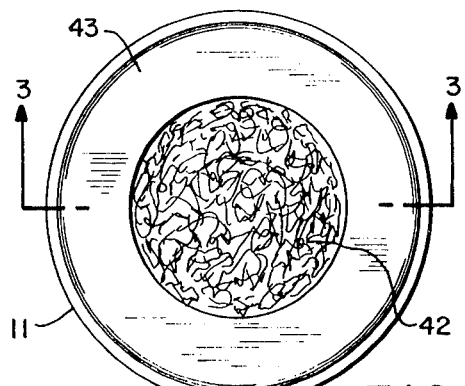
FIG.—2
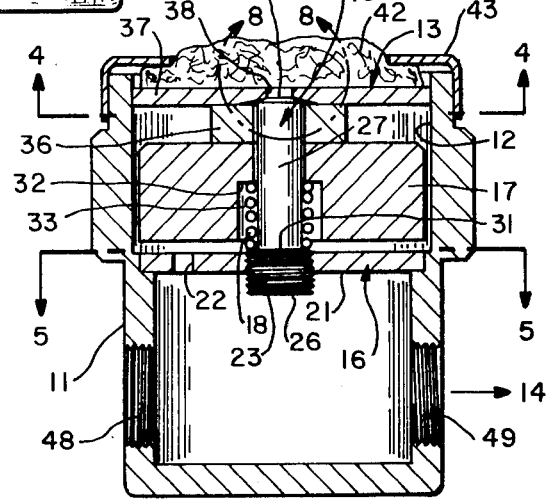
FIG.—3
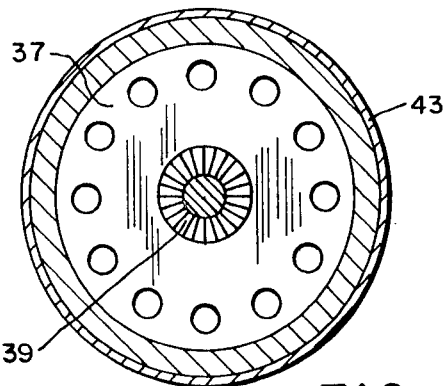
FIG.—4
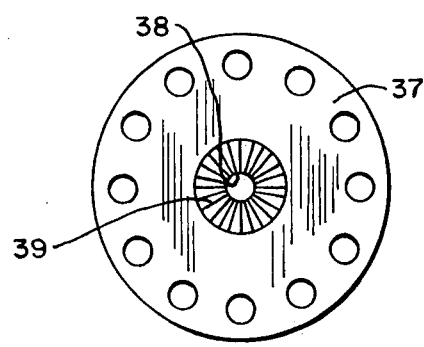
FIG.—6
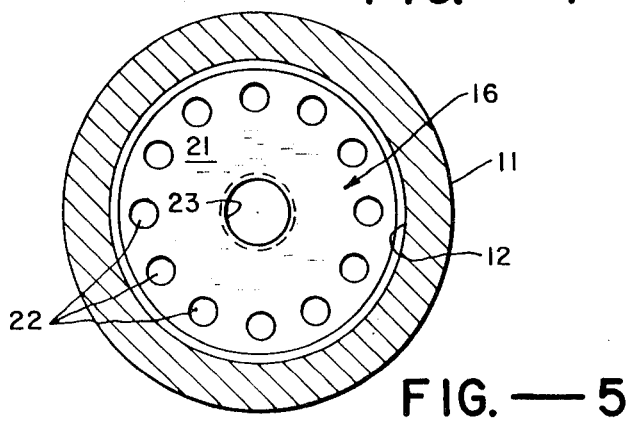
FIG.—5
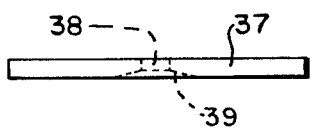
FIG.—7

AIR MONITORING VALVE FOR COMBUSTION ENGINES

This application is a continuation-in-part of Application Ser. No. 711,553 filed Aug. 4, 1976, now abandoned.

BACKGROUND OF THE INVENTION

1. Field of the Invention

The invention relates to vacuum-operated, pressure-responsive valves designed for connection to the intake manifold of an internal combustion engine for monitoring supplemental air to the engine, see U.S. Pat. No. 2,454,480.

2. Description of Prior Art

Automobile engines exhibit considerable variance in their ability to properly and efficiently use supplemental air and such variance occurs not only between different automobiles, but also automobiles of the same make. Consequently the device may not admit sufficient supplemental air to accomplish its intended purpose or, on the other hand, admit too much air and thus seriously impair the performance of the engine. While devices of the present character are capable of providing a major increase in fuel economy without significantly detracting from engine performance, the lack of universality of prior art devices and lack of dependable consistency in operation has prevented their widespread adoption and use.

SUMMARY OF THE INVENTION

An object of the present invention is to provide an air monitoring valve for internal combustion engines of the character described which may be simply and readily adjusted by the user with the device installed and the engine running, thus affording a precise setting of the device for the individual engine on which it is installed, the adjustment being accomplished without requiring dismantling of the device, and which, when so adjusted, will maintain its exact setting over a long period of use.

Another object of the present invention is to provide an air monitoring valve of the character above which will exhibit a more dependable and improved consistency and accuracy of operation in its admission of supplemental air to the engine.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWINGS

FIG. 1 is a side elevation of an air monitoring valve for combustion engines constructed in accordance with the present invention;

FIG. 2 is a plan view of the valve;

FIG. 3 is a longitudinal cross-section of the valve taken substantially on the plane of line 3—3 of FIG. 2;

FIG. 4 is a cross-sectional view of the valve taken substantially on the plane of line 4—4 of FIG. 3;

FIG. 5 is a cross-sectional view of the valve taken substantially on the plane of line 5—5 of FIG. 3;

FIG. 6 is a bottom plan view of one of the parts seen in FIG. 4;

FIG. 7 is an edge elevation of the part shown in FIG. 6; and

FIG. 8 is an enlarged fragmentary cross-sectional view of the portion indicated by the line 8—8 of FIG. 3.

DETAILED DESCRIPTION OF INVENTION

The air monitoring valve of the present invention comprises, briefly, a housing 11 providing an air cylinder 12 having an air inlet opening 13 and an air discharge passage 14 adapted for connection to an engine intake manifold (not shown); means 16 in cylinder 12, providing a valve seat, and a pressure-responsive valve 17, mounted in the cylinder for movement to and from seat 16 to regulate airflow in discharge passage 14 as a function of intake manifold pressure; means 18 applying a biasing force urging valve away from seat 16; and manually controlled means 19 for adjusting the magnitude of the biasing force for selectively changing the airflow/manifold pressure relationship.

Means 16 here comprises a plate 21, see FIG. 5, formed with a plurality of circumferentially spaced apertures 22 collectively providing the discharge passage and a threaded central opening 23 receiving the threaded end 26 of a stem 27 forming part of means 19, the stem extending from plate 21 axially of cylinder 12 in the direction of air inlet opening 13 and having an outer end 28 accessible through the air inlet opening for rotation of the stem relative to the plate. Valve 17 here comprises a piston mounted on stem 27 for longitudinal reciprocation in cylinder 12 for movement to and from plate 21, the piston having a predetermined clearance with respect to cylinder 12 and stem 27 so as to simultaneously provide a predetermined airflow past the piston and the required pressure-responsive movement of the piston. Biasing means 18 here comprises a helical spring mounted in surrounding relation to stem 27 with one end supported on a spring rest 31 formed on stem 27 adjacent the threaded end 26 and its opposite end engaging a spring rest 32 provided by the base of a spring-receiving recess 33 formed in piston 17 and opening to its internal face 34 opposed to and movable into and from engagement with plate 21. As will be observed, movement of piston face 34 toward its seated position is accomplished against the resistance of spring 18; and the magnitude of this resistance is controlled by the setting of stem 27. Threaded end 26 of the stem may be relatively enlarged, as here shown, so as to form a shoulder at its internal end providing spring rest 31, and the last internal thread is preferably upset so as to provide a stop for the threaded movement of the end into plate 21, when spring rest 31 will be substantially flush with plate 21, thus providing minumum compression of spring 18.

The units are preferably preset at the factory in the position described and which affords minimum introduction of supplemental air. The subsequent adjustment of the device after installation is, therefore, only one in which the user will back out the stem to increase the required compression of spring 18 in order to effect a closing off of supplemental air. It is generally important to most drivers that, when the engine accelerator is depressed for rapid acceleration, good engine response is obtained. If the tension on spring 18 is set too high, some sacrifice in acceleration response will be encountered. The setting, therefore, should provide good idling and smooth acceleration response. The ultimate in fuel saving is decreased slightly to accomplish most generally acceptable overall engine operation. In other words, considering that the device can be expected to effect a maximum of fuel saving of something up to about 14%, experience has indicated that a very satisfactory setting of the device for good all around engine performance will be with a fuel saving in the range of about 8-10%. A more precise fine tuning of the device will further improve fuel saving consistent with good engine performance.

To further improve the consistency and accuracy of operation of the present unit, means 36 is mounted in cylinder 12 for engagement with and providing a stop for piston 17 at its maximum spacing from valve seat 16. As here shown, a second perforated plate 37 is mounted in cylinder 12 adjacent air inlet opening and is formed with a central opening 38 for receiving the exterior stem end 28; and a spacer member, providing stop means 36, here in the form of a sleeve or collar, is mounted on stem 27 between piston 17 and plate 37 and is engageable therewith to provide a positive stop for the piston at its maximum spacing from the seat, thus precisely determining throughout the life of the device the maximum entry of supplemental air. Earlier attempts in the art to define this important basic position of the piston by the use of a second spring, as in U.S. Pat. No. 2,454,480, produced a floating piston subject to all of the variations encountered in individual springs and consequent variations in the pressure/airflow characteristics of the device. It could not be certain in such prior art structures as to just where the piston would be located. In the present device, the initial or reference piston position is always exactly located by spacer 36.

Another feature of the present invention is the provision of means of preserving the precise setting of the device against loosening or change due to vibration or the like over a long period of use. This is here accomplished by the butting of the outer end 28 of stem 27 with the underside of plate 37, which, in the present structure, is resiliently deflectible for resisting outward movement of the stem. Preferably, both plates 21 and 37 are prefitted into cylinder 12 to precise predetermined positions and stem end 28 is chamfered so as to partially enter and center itself within the wall of a center opening 38 in the plate, Also preferably, the underside of plate 37 surrounding opening 38 and the abutting chamfered end face 40 of stem 27 are formed with mating, interfitting radially extending serrations or ridges shown at 39 to provide a click stop indexing of the stem. Moreover, stem end 40 is formed with a screwdriver slot 41 disposed centrally in opening 38. Opening 38 will pass a screwdriver to engage and rotate stem end 28 and as the stem is backed out to increase the supplemental airflow to the engine, plate 37 will resiliently deflect to apply an increasing force on the stem end, which, coupled with the click stop ridge detenting structure, will firmly lock the stem against inadvertent displacement when moved to its final individualized setting for the engine on which the device is installed.

Preferably, a fibrous air filter mass 42 is mounted on the exterior of plate 37, here being secured by a collar 43, the open mesh nature of the mass permitting insertion therethrough of a tool such as a screwdriver for engaging and turning stem end 28. In the present device, a pair of hose fittings 46 and 47 are secured in threaded openings 48 and 49 to enable convenient connection of the present device in the PCV line of a smog control system connecting the engine crankcase with the intake manifold. It is thus convenient to insert the present device in that line to obtain the intake manifold vacuum source for actuation of the device and to provide the supplemental airflow to the manifold.

What is claimed is:

1. An air monitoring valve for combustion engines comprising:
   a housing providing an air cylinder having an air inlet opening and an air discharge passage, the latter being adapted for connection to an engine intake manifold;
   means providing a valve seat in said cylinder and a pressure-responsive valve mounted in said cylinder for movement to and from said seat to regulate airflow in said discharge passage as a function of intake manifold pressure, said piston being formed to simultaneously provide a predetermined airflow past said piston and said pressure-responsive movement of said piston;
   a stem threadably mounted in said cylinder and extending therefrom longitudinally thereof in the direction of, and having an end accessible through, said air inlet opening, said valve being mounted on said stem for longitudinal reciprocation in said cylinder to and from said seat;
   spring means mounted between said stem and valve for biasing said valve away from said seat; and
   a resiliently deflectable plate supported by said housing adjacent said inlet opening and formed with an opening aligned with and providing an interference fit with said stem end and affording access to said stem end for turning, said plate resiliently deflecting with rotative adjustment of, and applying longitudinal pressure to, said stem.

2. The apparatus of claim 1, said stem end being tapered to provide a centering fit with the wall of said plate opening; and
   said stem end and wall being formed to provide a click stop indexing of said stem.

3. The apparatus of claim 2, and
   a spacer member mounted on said stem between said piston and plate and engageable therewith to provide a stop for said piston at its maximum spacing from said seat.

4. The apparatus of claim 2, said stem end being formed with a tool-engaging portion; and
   a fibrous air filter member mounted on and exterior of said plate and formed for insertion therethrough of a tool for engaging and turning said stem end portion.

* * * * *